United States Patent
Kniffler et al.

(10) Patent No.: US 7,599,383 B2
(45) Date of Patent: Oct. 6, 2009

(54) DATA BUS CONFIGURATION HAVING A DATA BUS WHICH CAN BE OPERATED IN MULTIPLEX MODE, AND METHOD FOR OPERATING THE CONFIGURATION

(75) Inventors: Oliver Kniffler, München (DE); Holger Sedlak, Sauerlach (DE)

(73) Assignee: Infineon Technologies AG (DE)

( * ) Notice: Subject to any disclaimer, the term of this patent is extended or adjusted under 35 U.S.C. 154(b) by 907 days.

(21) Appl. No.: 10/662,794

(22) Filed: Sep. 15, 2003

(65) Prior Publication Data

US 2004/0073729 A1     Apr. 15, 2004

Related U.S. Application Data

(63) Continuation of application No. PCT/DE02/00549, filed on Feb. 15, 2002.

(30) Foreign Application Priority Data

Mar. 15, 2001 (DE) .................... 101 12 541

(51) Int. Cl.
  *H04J 3/16* (2006.01)
  *H04L 12/40* (2006.01)
  *H04B 7/212* (2006.01)
(52) U.S. Cl. ............ 370/437; 370/438; 370/439; 370/442; 370/443; 370/444

(58) Field of Classification Search ............... 370/437, 370/438, 439, 442, 443, 444, 535, 498; 340/2.5
See application file for complete search history.

(56) References Cited

U.S. PATENT DOCUMENTS

| | | | | |
|---|---|---|---|---|
| 4,677,616 A * | 6/1987 | Franklin | ........................ | 370/423 |
| 4,713,805 A | 12/1987 | Henaff | ........................ | 370/85 |
| 4,827,471 A | 5/1989 | Geiger et al. | ................. | 370/85 |
| 5,124,983 A * | 6/1992 | Landez et al. | ............... | 370/353 |
| 5,425,022 A * | 6/1995 | Clark et al. | .................. | 370/360 |
| 5,546,396 A | 8/1996 | Clauzel et al. | ............. | 370/85.1 |
| 5,887,188 A * | 3/1999 | Wakatani | ..................... | 712/31 |
| 6,442,168 B1 * | 8/2002 | Vasa | ........................... | 370/401 |
| 6,522,660 B1 * | 2/2003 | Mukaihara et al. | .......... | 370/443 |
| 6,674,853 B1 * | 1/2004 | Ezell et al. | ................... | 379/242 |
| 2003/0103508 A1 * | 6/2003 | Landaveri et al. | ........ | 370/395.1 |
| 2003/0174724 A1 * | 9/2003 | Olson et al. | ................. | 370/420 |
| 2003/0179715 A1 * | 9/2003 | Viard et al. | .................. | 370/252 |
| 2005/0010698 A1 * | 1/2005 | Haverinen et al. | ............. | 710/3 |

* cited by examiner

*Primary Examiner*—Chi H Pham
*Assistant Examiner*—Farah Faroul
(74) *Attorney, Agent, or Firm*—Dickstein, Shapiro, LLP.

(57) ABSTRACT

A data bus configuration has a data bus which can be operated in a multiplex mode and to which at least one control station and a reception station are connected. The data bus configuration further has a control bus via which the control station can allocate a logical channel to the reception station.

13 Claims, 1 Drawing Sheet

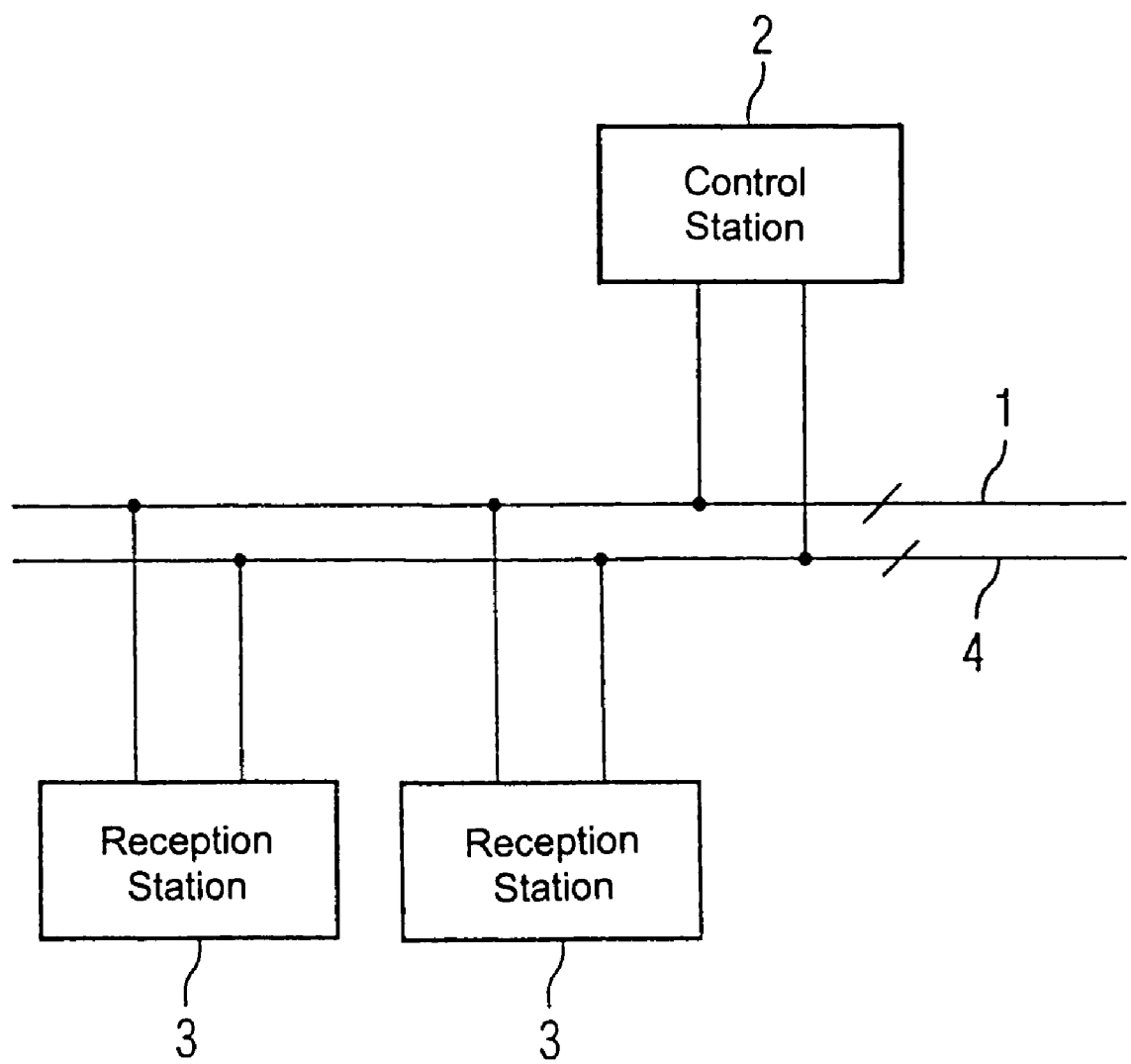

DATA BUS CONFIGURATION HAVING A DATA BUS WHICH CAN BE OPERATED IN MULTIPLEX MODE, AND METHOD FOR OPERATING THE CONFIGURATION

CROSS-REFERENCE TO RELATED APPLICATION

This application is a continuation of copending International Application No. PCT/DE02/00549, filed Feb. 15, 2002, which designated the United States and was not published in English.

BACKGROUND OF THE INVENTION

Field of the Invention:

The invention relates to a data bus configuration having a data bus that can be operated in a multiplex mode and to a method for operating the configuration. In general, the provision of two data bus configurations is normal and necessary. The two buses include a data bus and an address bus. The address bus is used by a control station, called a "master" below, to call a reception station, called a "slave" below, and a data item or a plurality of data items is/are then interchanged between the master and slave via the data bus. Such a configuration has the drawback that it is necessary to provide both a data bus and an address bus which need to have a large number of lines according to the bit length.

In addition, data bus configurations are known which are operated in the multiplex mode. In this case, the data bus is used by the master first to transfer an address of the slave to be solicited. Next, the data are then interchanged. This requires a fair amount of application, particularly when the master and slave are situated on a single chip and are connected to one another via the bus.

SUMMARY OF THE INVENTION

It is accordingly an object of the invention to provide a data bus configuration having a data bus that can be operated in a multiplex mode, and a method for operating the data bus configuration which overcome the above-mentioned disadvantages of the prior art devices and methods of this general type, which can be operated in the multiplex mode, and where the multiplex mode is simplified.

With the foregoing and other objects in view there is provided, in accordance with the invention, a data bus configuration. The data bus configuration contains at least one control station, at least one reception station, a data bus operated in a multiplex mode and connected to the control station and to the reception station, and a control bus connected to the control station and to the reception station. The control bus, through the control station, allocates a logical channel to the reception station.

The provision of a control bus makes it possible to allocate a logical channel to the solicited slave via the control bus after or at the same time as the transfer of an address in the multiplex mode. The logical channel then remains allocated until the master allocates the logical channel to another slave. While the logical channel has been allocated, it is not first necessary to call the address of the slave to be solicited before a data interchange, but rather the logical channel need merely be open. In this way, the multiplex mode is restricted with little application. This measure is naturally worthwhile only while the control bus has a restricted width for soliciting the logical channel, since it would otherwise be possible to dispense with the multiplex mode completely and the address and data buses could be used. On the whole, however, the configuration affords the advantage that the fundamental provision of the multiplex mode for address and data transfer allows a very extensive address space to be solicited, and the additional provision of the control bus having a restricted bit width makes it possible to switch quickly between sought slaves, with no prior stipulation being given as to who the sought slaves are. Other features which are considered as characteristic for the invention are set forth in the appended claims.

Although the invention is illustrated and described herein as embodied in a data bus configuration having a data bus which can be operated in the multiplex mode, and a method for operating the data bus configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a block circuit diagram of an exemplary embodiment of a data bus configuration according to the invention.

DESCRIPTION OF THE PREFERRED EMBODIMENTS

Referring now to the single FIGURE of the drawing in detail, there is shown a data bus 1 which has a bit width which is not denoted in more detail. The data bus 1 has a control station 2 connected to it, which is also called a "master". The data bus 1 likewise has a reception station 3 connected to it, which is also called a "slave". According to the bit width of the data bus 1 and the address space that can thus be solicited, a plurality of slaves 3 can be connected to the data bus 1. Before data are sent or retrieved by the master 2 via the data bus 1, the master 2 sends an address via the data bus 1. The data bus 1 is constantly checked by the connected slaves 3 and, as soon as its own address appears on the data bus 1, the respective slave 3 regards itself as having been solicited. Instructions and/or data are then interchanged via the data bus 1 in accordance with a prescribed customary convention. This can involve, by way of example, a write instruction and data to be written from the master 2 to the slave 3. Equally, a read instruction from the master 2 to the slave 3 can be involved. Since the slaves 3 are constantly monitoring the data bus 1, it is normally necessary for any data interchange, i.e. instruction and data item, to be preceded by the output of the address of the solicited slave 3 by the master 2 so that the slave 3 to be solicited can be identified.

In addition, the invention now provides a control bus 4 to which both the master 2 and the slave 3 are connected. For operation, the master 2 first uses the data bus 1 to transfer the address, so that the slave 3 is solicited. This is followed by an allocation instruction used to allocate a particular logical channel to the previously solicited slave 3. Once the allocation has been made, the master 2 does not need to transfer the address via the data bus 1 first before the sought slave 3 is next solicited, but rather it suffices to transmit the logical channel via the control bus 4. The slave 3 monitors the control bus 4 and has been solicited as soon as its logically allocated channel has been opened by the control bus 4.

If the control bus 4 contains one line, then two logical channels can be allocated.

If the control bus contains two lines, i.e. a bit width of two, then four logical channels etc. can be set up. However, this does not mean that only as many slaves 3 can be connected to the data bus configuration as there are logical channels. Additional slaves 3 can be solicited just using the address.

If all the slaves 3 need to be constantly solicitable via the control bus 4, then the bit width of the control bus needs to be chosen such that a sufficient number of logical channels can be addressed. During addressing, each slave 3 is allocated a logical channel that is valid until another address and hence another slave 3 is allocated to this channel.

During operation, in order to be able to change logical channels, addresses need to be transferred via the data bus 1 using a prescribed number of clock periods. Therefore, by way of example, three slaves 3 are connected to the data bus configuration and there are only two logical channels available, then, in accordance with a firmly prescribed convention, a particular logical channel previously allocated to the slave 3 can be taken away from the slave 3 and allocated to another slave 3 after a particular number of clock periods by calling the appropriate address.

This increases the flexibility with relatively little application and makes it possible to carry out a speedy data interchange between the master 2 and slave 3 with a greatly restricted multiplex mode.

We claim:

1. A data bus configuration, comprising:
    a control station;
    at least one reception station;
    a data bus configured to operate in a data and address multiplex mode and coupled to said control station and to said at least one reception station; and
    a control bus coupled to said control station and to said at least one reception station, wherein said control station is configured to allocate a logical channel, via said control bus, between said control station and said at least one reception station.

2. The data bus configuration according to claim 1, wherein said control station is configured to transmit an address of said at least one reception station on said data bus before data is to be interchanged between said control station and said at least one reception station.

3. The data bus configuration according to claim 2, wherein said at least one reception station is configured to continuously monitor said data bus and determine when said address transmitted by said control station matches an address designated for said at least one reception station.

4. The data bus configuration according to claim 3, wherein said control station allocates a logical channel between said control station and said at least one reception station, enabling data to be interchanged between said respective stations.

5. The data bus configuration according to claim 4, wherein data is interchanged between said control station and said at least one reception station for a time period that the logical channel remains allocated on said control bus.

6. The data bus configuration according to claim 5, wherein data is interchanged between said control station and said at least one reception station until the control station allocates the logical channel to another reception station.

7. The data bus configuration according to claim 4, wherein said at least one reception station is configured to continuously monitor said control bus and determine when a logical channel transmitted by said control bus matches the allocated logical channel designated for said at least one reception station.

8. A method for operating a data bus configuration having a control station, at least one reception station, a data bus configured to operate in a data and address multiplex mode and coupled to said control station and to said at least one reception station, and a control bus coupled to said control station and to said at least one reception station, said method comprising:
    transmitting an address by said control station via the data bus;
    continuously monitoring the data bus by said at least one reception station;
    soliciting said at least one reception station when said address transmitted by said control station matches an address designated for said at least one reception station;
    allocating a logical channel between said solicited reception station and said control station, via the control bus; and
    interchanging data between said control station and said solicited reception station for a time period that the logical channel remains allocated to said solicited reception station.

9. The method according to claim 8, wherein said at least one reception station is solicited through the control bus by calling the allocated logical channel at a same time as a transfer of the data.

10. The method according to claim 9, wherein data is interchanged between said control station and said at least one reception station until the control station allocates the logical channel to another reception station.

11. The method according to claim 8, wherein said at least one reception station is solicited through the control bus by calling the allocated logical channel before a transfer of the data.

12. The method according to claim 11, wherein data is interchanged between said control station and said at least one reception station until the control station allocates the logical channel to another reception station.

13. A data bus configuration, comprising:
    a control station;
    at least one reception station;
    a data bus configured to operate in a data and address multiplex mode and coupled to said control station and to said at least one reception station; and
    a control bus coupled to said control station and to said at least one reception station, wherein said control station is configured to allocate a logical channel, via said control bus, between said control station and said at least one reception station,
    wherein said control station and said at least one reception station interchange data for a time period while said logical channel remains allocated to said at least one reception station.

* * * * *